Patented Feb. 20, 1951

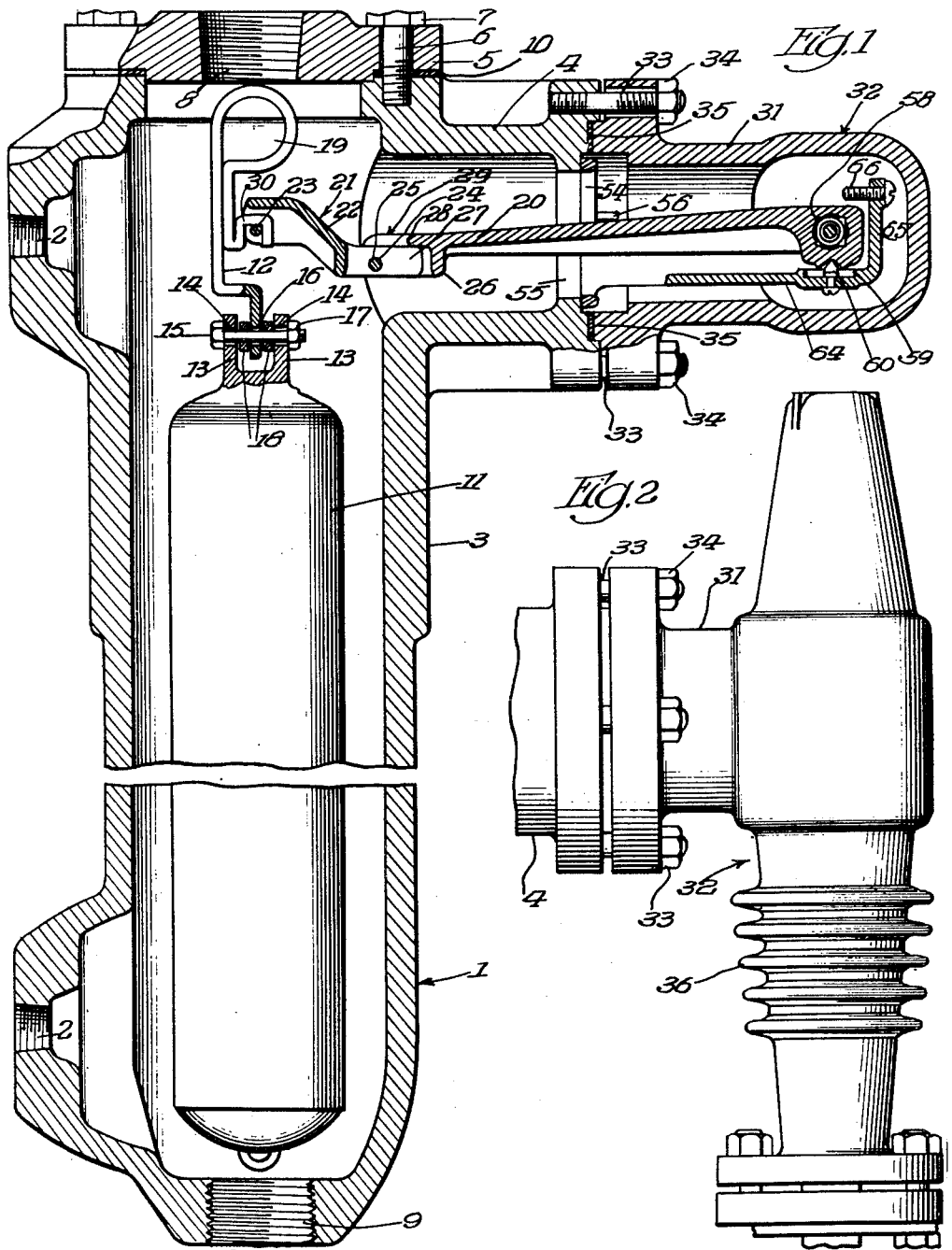

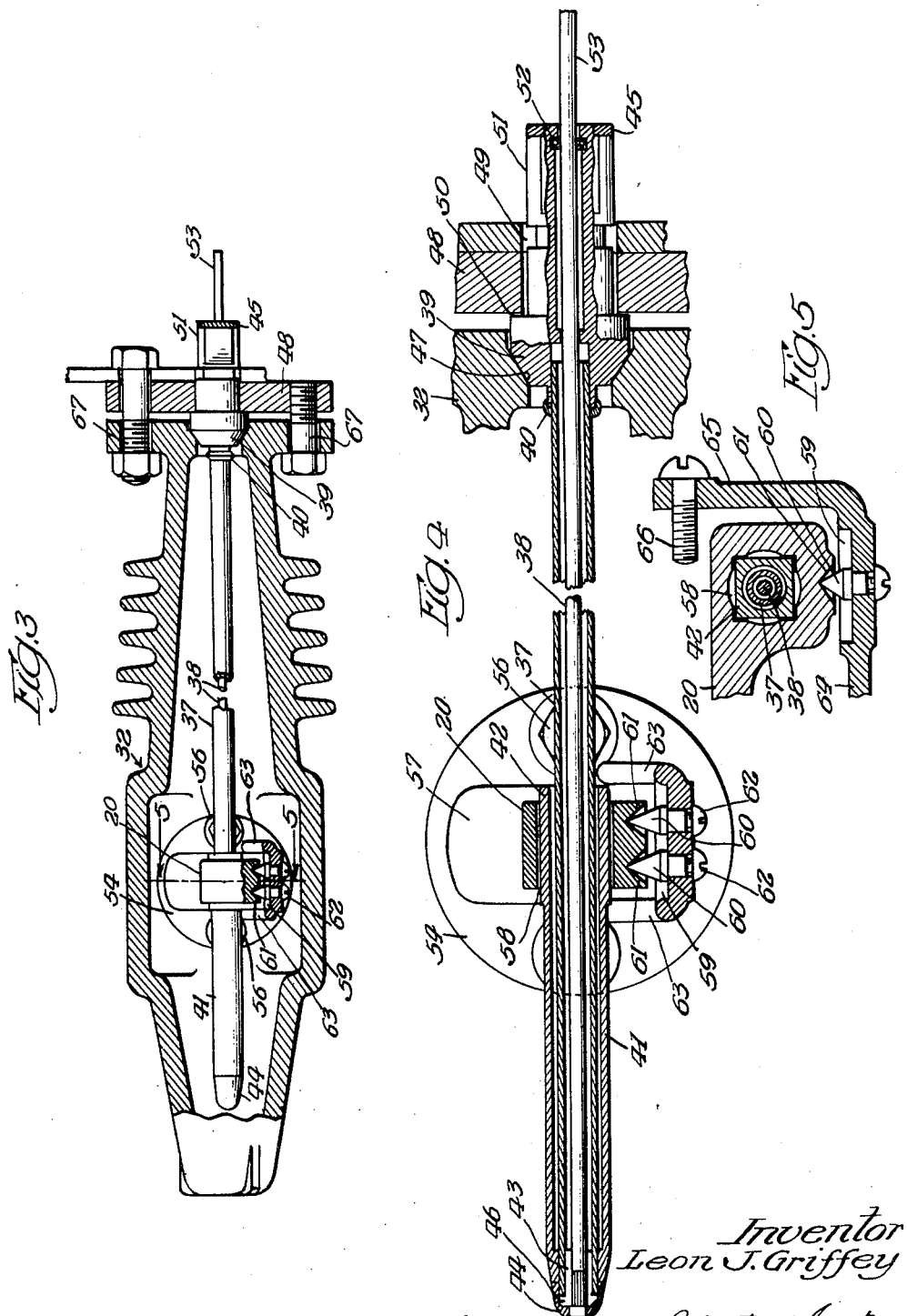

2,542,769

UNITED STATES PATENT OFFICE 2,542,769

MOTION TRANSMITTING DEVICE

Leon J. Griffey, Tulsa, Okla., assignor, by mesne assignments, to Black, Sivalls & Bryson, Inc., a corporation of Delaware Application August 29, 1945, Serial No. 613,303

5 Claims. (Cl. 74—519)

This invention relates to new and useful improvements in motion transmitting devices and more particularly in a liquid level controller of the type described in my U. S. Patent 2,263,771, patented November 25, 1941.

In this type of controller a float is connected to a float arm which in turn is connected to a torsion tube assembly in such a manner that slight movements of the float are transmitted to the float arm which in turn transmits them to the torsion tube assembly. The latter is usually connected to a pilot valve unit which in turn controls the admission of liquid.

One of the objects of the present invention is to provide a motion transmitting device of the type containing a torsion tube assembly, in which the torsion tube assembly can be removed as a unit without the necessity of dismantling the apparatus and removing other parts thereof.

Still a further object of the invention is to provide a new and improved liquid level controller.

A further object of the invention is to provide a new and improved device of the type described in which the motion transmitting elements are supported in a novel manner.

A still further object of the invention is to provide a device of the type described in which the torque on the torsion tube is readily adjusted at any time during the operation of the device without the necessity of dismantling it.

An additional object of the invention is to provide a new and improved type of liquid level controller in which the float can be disconnected from the float arm without dismantling the apparatus.

Other objects and advantages of the invention will appear from the following description thereof in conjunction with the accompanying drawings in which:

Fig. 1 is a sectional view taken vertically through the float cage, the float arm and the float arm housing, and transversely through the torsion tube unit and torsion tube housing;

Fig. 2 is a top plan view of the torsion tube housing and a portion of the float arm housing;

Fig. 3 is a sectional view of the torsion tube assembly, including the housing;

Fig. 4 is an enlarged detail view of the torsion tube assembly shown in Fig. 3 with the housing broken away; and Fig. 5 is a sectional view taken along the line 5—5 of Fig. 3.

In the drawings the float cage generally indicated at 1 may be connected to any suitable receptacle or container wherein it is desired to control the level of the liquid therein. The connections 2 are provided adjacent the upper and lower extremities of the float cage, and are used either for gauge glass connections or equalizing connections, normally gauge glass connections. In the form of the invention illustrated in the drawings, the float cage consists of a body 3 having an outwardly extending upper portion 4, and provided at the top with a cover 5 which is secured to the upper part of the body by means of bolts 6 and nuts 7, or in any other suitable manner whereby the cover 5 is removable. The openings 8 and 9 are the usual equalizing connections. A gasket 10 is provided as a seal between the cover 5 and the upper part of the body 3.

The float 11 is suspended within the body 3 of the float cage 1 in the manner shown in Fig. 1, and is supported from the upper end by the member 12. The float 11 is provided at its upper end with a pair of upwardly extending elements 13 provided with holes 14, through which passes a bolt 15. The bolt 15 also passes through an opening 16 in the lower part of the supporting member 12 and is held in place by means of a nut 17. Collars or washers 18 are provided to restrict the lateral movement of the float 11 and the supporting element 12 with respect to the bolt 15. The float 11 is otherwise freely mounted with respect to the supporting element 12. At the upper part of the supporting element 12 is a loop or finger hole 19, the purpose of which will be hereinafter explained. The supporting element 12 is loosely connected to the float arm 20 through a pivotal connection generally shown at 21.

The pivotal connection 21 consists of a connecting member 22 provided at one end with a stud 23, and at the other end with an aperture or hole 24, through which passes a bolt or machine screw 25, which is secured to the end portion 26 of the float arm 20. The connecting element 22 is freely mounted with respect to the bolt 25 and will pivot or rotate around the bolt 25 in an upwardly direction. Movement in a downwardly direction is prevented by the end portion 27 of the connecting element 22 which abuts against the portion 28 of the float arm 20. An opening 29 is provided in the upper part of the inner end of the float arm 20 to permit the upward movement of the connecting element 22.

As shown in Fig. 1, a hook-like member 30 is disposed over the stud 23 to connect the connecting element 22 to the supporting element 12. By this arrangement it is possible to reach through the hole 8 with a hook, insert the latter through the opening 19 in the supporting element 12, pull the supporting element upwardly, and thereby automatically disengage the hook 30 from the stud 23 and disconnect the float 11 from the float arm 20. Thus, it is possible to disconnect the float 11 from the float arm 20 without dismantling the entire unit. It is also possible to remove the float 11 completely from the float cage 1 by removing the cover 5 and pulling upwardly on the supporting element 12 from the ring 19.

As shown in Figs. 1 and 2, the float arm 20 is housed in a housing which consists of two parts, namely, an upper outwardly extending portion 4 integrally formed with the body 3 of the float cage, and an inwardly extending portion 31 integrally formed with the housing of the torson tube unit generally indicated at 32. The housing portion 4 and the housing portion 31 are flanged in the manner shown in Figs. 1 and 2 and connected together by suitable bolts 33 provided with nuts 34. A gasket 35 is provided to seal the joint between the housing members 4 and 31. The torsion tube housing 32 is preferably provided with vanes or ribs 36.

The torsion tube assembly is illustrated in detail in Figs. 3, 4 and 5, and comprises a torsion tube 37, a torsion rod member 38 which extends through the torsion tube, the anchor block 39 which is welded to the torsion tube at point 40, the torsion tube extension 41 which surrounds the torsion tube, and is provided with an area of square cross section at 42, the torsion tube plug 43 which is welded to the torsion tube by the weld 44, and the bearing cage assembly 45. The torsion rod member 38 is firmly held in place by the weld 44 and is thereby fixed at one end to the torsion tube plug 43. The torsion tube plug 43 abuts against the end of the torsion tube 37 at the point 46, and is also held in place by the weld 44. Likewise, the weld 44 fixes the torsion tube in place with respect to the torsion tube extension 41. At the other end the torsion tube 37 is anchored to the anchor block 39 in the manner just described by means of the weld 40. The torsion rod member 38 is fixed to one end of the torsion tube in the manner just described, but is free at the other end and passes through the bearing cage assembly 45, which is a part of the anchor block assembly. The exterior of the anchor block 39 is preferably substantially conical in shape, as shown at 47 in Fig. 4, to fit into a complementary opening in the adjacent end of the torsion tube housing 32. A ground joint is provided between the conical end of the anchor block and the engaging portion of the torsion tube housing, whereby a fluid tight seal is insured between the interior of the torsion tube housing and the pilot valve casing 48. The anchor block 39 is preferably reduced at its opposite end to fit closely into an opening 49 in the pilot valve casing 48, the base 50 of the conical portion forming a shoulder which abuts the outer face of said housing.

The inner end of the anchor block is squared as at 51 to receive a suitable wrench, and projects into the pilot valve casing 48, as shown in Fig. 4, for adjusting the torsion on the tube 37.

As previously explained, the torsion rod member 38 is fixed at one end by the torsion tube plug 43 and extends longitudinally through the torsion tube 37 in spaced relation thereto, its other end extending through a ball bearing assembly 52 in the bore of the anchor block 39, thereby preventing lateral displacement of the rod in operation.

The free end 53 of the torsion rod member is connected to a pilot valve assembly of any suitable type in the manner described, for example, in my U. S. Patent 2,263,771, it being understood that the present invention is not limited to the use of any particular type of valve structure. The end of the torsion rod member 53 may also be employed to operate an indicator, to control an electrical circuit, or may be connected to other means for controlling the level of the liquid.

The entire torsion tube assembly previously described is supported from a supporting member 54, which is rigidly held against the abutment 55 in the portion 4 of the float arm cage by means of bolts 56 (see Fig. 1). The float arm 20 extends through an opening 57 in the support 54, as illustrated in Fig. 4. The float arm 20 is provided at one end with an opening 58 of square cross section, as shown in Fig. 1, and the portion 42 of the torsion tube extension fits snugly in the opening 58, as shown, for example, in Fig. 5. The supporting member 54 extends longitudinally in the direction of the torsion tube cage 32, as shown in Fig. 1, and adjacent one end is provided with a recessed portion 59, in which is seated a pair of cone shaped bearings or supporting elements 60 which are aligned in the cone shaped recesses 61, and serve to support the end of the float rod 20. The cone shaped bearings 60 are held in place by screws 62. The inner end of the supporting element 54 is circular in cross section and abuts against a flange in the float rod cage portion 4. The sides 63 taper downwardly in the direction of the torsion tube housing, and the bottom 64 terminates in an upward bend 65, in which there is a screw 66 to prevent accidental displacement of the float rod and torsion tube assemblies from the bearings 60. It will be apparent that in order to remove the bearings 60 it is only necessary to remove the nuts 34, thereby permitting separation of the torsion tube housing and giving access to the nuts 56. By loosening the nuts 56, the whole supporting structure 54 for the bearings 60 can be removed as a unit.

When this apparatus is installed for use in controlling the liquid level in a container or tank, the equalizing connections 2 on the float cage are connected to the proper points in the tank, and a suitable pilot valve assembly is connected to the end 53 of the torsion rod member 38 to control a motor valve (not shown) which directly controls the discharge from or the input of liquid in the tank. The torsion rod member 38 may also be connected to any suitable type of liquid level indicator.

The torsion tube assembly is adjusted for operation by loosening the bolts 67, thereby relieving the grip of the torsion tube housing 32 on the conical end portion 47 of the anchor block 39. A wrench or other suitable tool is then applied to the squared end 51 of the anchor block, and the anchor block is turned in clockwise direction to adjust the torque on the torsion tube 37. As previously explained, the torsion tube 37 is fastened to the float rod 20 through the portion 42 of the torsion tube extension 41. The float 11 is fastened to the other end of the float rod 20 in the manner previously explained, and, therefore, any torque applied to the anchor block at the point 51 will be imparted to the float 11. The anchor block 39 is preferably turned in clockwise direction until the torque of the torsion tube 37 is sufficient to merely support the float 11 off of the bottom stop of the float cage 1. The bolts 67 are then tightened to bring the end of the housing 32 against the conical end 47 of the anchor block 39, thus maintaining the adjustment of the torque.

In operation, any variation of the liquid being controlled is transmitted to the float cage 1 through the equalizing connections 8 and 9, and thus the float 11 is responsive to such variations. The float 11 may or may not be buoyant in the liquid by itself, depending upon the nature of the installation. The float preferably operates by variations in the effective weight of the float in the liquid, caused by variations in the submergence of the float in the liquid in the float cage. In other words, the torsion in the tube 37 normally supports the float in operative condition, thereby increasing the equivalent buoyancy of the float to such an extent that variation in partial submergence of the float gives the necessary change in torsion in tube 37 to upset static equilibrium, thereby causing the torsion tube 37 to rotate to a position of exerted torsion for final equilibrium. A rise in the liquid level in the float cage 1 will give an equivalent increase in buoyancy, thereby causing the torsion tube 37 to rotate to such a position that the equilibrium of the exerted torsion, the weight of the float, and the displaced weight of the liquid are in balance.

The slightest movement of the float 11 and the float arm 20 are transmitted directly through the torsion rod 38 to any suitable pilot valve control, or other type of controlling device.

Heretofore, in devices of this type, it has not been possible to remove the torsion tube assembly as a unit without dismantling a major part of the apparatus. One of the features of this invention is the provision of a unitary torsion tube assembly which is removable merely by unloosening the bolts 67 and removing the pilot valve housing 48. The nut 42 of the torsion tube extension 41 is readily slidable through the opening 58 in the float arm 20, and, hence, the entire torsion tube assembly is readily removed without disturbing the float arm 20 or its relation to the other component parts of the apparatus. After the removal of the torsion tube assembly, the float arm 20 continues to be supported by the cone bearings 60 and the connection 22 to the float 11 remains undisturbed.

Another feature of the invention resides in the provision of means for removing the bearing supports 60 as a unit without disturbing the connection between the float 11 and the float arm 20. This is accomplished in the manner previously described by removing the bolts 33 to separate the housing 4 from the housing portion 31, and then removing the nuts 56, thereby permitting the removal of the supporting structure 54, in which the bearings 60 are mounted.

A third feature of the invention is the provision of means for removing the float 11 from the float arm 20 in the manner previously described without the necessity for dismantling any other portion of the aparatus, such as the float arm housing or the torque tube assembly housing.

The double cone support 60 is positioned at a point below the center of the torque tube, which gives a slight deflecting action as well as changeable torque in the tube for different positions of the liquid level. However, this does not interfere with the operation of the device, and the double cone bearing support in the recessed portions 61 of the float arm balances the float arm while providing a minimum frictional engagement therewith.

All of these improvements have been effected while maintaining ease of torsion tube adjustment, and thus the present invention offers a number of advantages and improvements over previous types of liquid level controllers.

Having thus described the invention, what I claim as new and desire to secure by Letters Patent of the United States is:

1. In a device for transmitting motion from a movable element within a housing to motion utilizing means outside of said housing, a resilient tube, a rod extending longitudinally through said tube in spaced relation thereto, said rod being rigidly secured to said tube at one end, its opposite end projecting freely through said tube and said housing, a movable motion transmitting element within said housing, supporting means rotatably supporting said movable element adjacent one end thereof, means torque transmittingly but detachably connecting said movable element adjacent said supporting means with said tube, said connecting means allowing said tube to be disconnected from said movable element without disturbing the relationship between the movable element and said supporting means, and means detachably securing the opposite end of said tube to said housing, whereby said tube and its associated rod may be removed as a unit from said housing without disturbing the relationship of the other elements therein.

2. In a device for transmitting motion from a movable element within a housing to motion utilizing means outside of said housing, a resilient tube, a rod extending longitudinally through said tube in spaced relation thereto, said rod being rigidly secured to said tube at one end, its opposite end projecting freely through said tube and said housing, a movable motion transmitting element within said housing, supporting means comprising at least one substantially conical element disposed beneath said movable element and pivotally supporting said movable element adjacent one end thereof, means torque transmittingly connecting said movable element with said tube adjacent said supporting means, and means securing the opposite end of said tube to said housing.

3. A device as claimed in claim 2 in which said supporting means comprises substantially conical elements disposed on opposite sides of said movable element.

4. A device as claimed in claim 1 in which said supporting means is removable from the housing without removing said movable element.

5. In a motion transmitting device, the combination of, a motion transmitting element having an aperture adjacent one end thereof, a torsion tube assembly comprising a resilient tube, a rod extending longitudinally through said tube in spaced relation thereto, said rod being rigidly secured to said tube at one end, its opposite end projecting freely through said tube, said tube and rod assembly being positioned adjacent one end thereof in the aperture in said motion transmitting element in torque transmitting slidable relationship therewith, whereby said torsion tube assembly can be removed merely by sliding it out of said aperture.

LEON J. GRIFFEY.

REFERENCES CITED

The following references are of record in the file of this patent:

UNITED STATES PATENTS

| Number | Name | Date |
|---|---|---|
| 1,078,783 | Grimm | Nov. 18, 1913 |
| 1,404,308 | Lonshaw | Jan. 24, 1922 |
| 1,576,600 | Haas | Mar. 16, 1926 |
| 2,263,771 | Griffey | Nov. 25, 1941 |
| 2,353,641 | Brockett | July 18, 1944 |
| 2,376,473 | Brockett | May 22, 1945 |
| 2,417,108 | Guibert | Mar. 11, 1947 |